United States Patent [19]

Monma et al.

[11] 4,300,085
[45] Nov. 10, 1981

[54] FAILURE DETECTION METHOD AND CIRCUIT FOR STEPPING MOTORS

[75] Inventors: Hisayoshi Monma; Shigenobu Katagiri, both of Katsuta, Japan

[73] Assignee: Hitachi Koki Company, Limited, Tokyo, Japan

[21] Appl. No.: 154,049

[22] Filed: May 28, 1980

[30] Foreign Application Priority Data

Jul. 18, 1979 [JP] Japan ............................ 54-91795
Jul. 18, 1979 [JP] Japan ............................ 54-91796

[51] Int. Cl.³ ............................................. G05B 19/40
[52] U.S. Cl. ................................. 318/696; 318/490; 318/565
[58] Field of Search ............... 318/696, 685, 490, 565

[56] References Cited

U.S. PATENT DOCUMENTS

| | | | |
|---|---|---|---|
| 4,025,836 | 5/1977 | Naito et al. | 318/565 X |
| 4,034,277 | 7/1977 | Leenhouts | 318/565 X |
| 4,099,103 | 5/1978 | Seeger et al. | 318/490 |
| 4,234,838 | 11/1980 | Langley et al. | 318/696 |
| 4,241,433 | 12/1980 | Ueda et al. | 318/696 X |

Primary Examiner—B. Dobeck
Attorney, Agent, or Firm—Lowe, King, Price & Becker

[57] ABSTRACT

A failure detection circuit for stepping motors having a rotor and a motor control circuit including first and second transistors respectively connected in series with first and second stator coils. The rotor is set in motion in response to energization of the second stator coil when the second transistor is activated and brought to a halt in response to energization of the first stator coil when the first transistor is activated. During the interval when the first transistor is activated, the potential at a circuit junction between the respective transistor and the associated coil is detected and compared with the logic level of the input to the associated transistor to check for a set of operational states of the circuit elements to give a warning indication if the compared levels have a predetermined relationship to each other. During the interval when the rotor is at standstill, the second transistor is activated in a brief interval so that the amount of current generated in the second stator coil is insufficient to generate a torque to the rotor and in this brief interval the above comparison is made to check for another set of operational states of the circuit elements to give a warning indication if the compared levels have a predetermined relationship therebetween.

5 Claims, 7 Drawing Figures

FAILURE DETECTION METHOD AND CIRCUIT FOR STEPPING MOTORS

BACKGROUND OF THE INVENTION

The present invention relates to failure detection circuits for stepping motors having a rotor which is driven stepwisely in response to successive energization of its stator coils, and in particular to a circuit for detecting a failure in switching circuits associated with the coils and an open circuit in the coils prior to the time the rotor is set in motion.

The stepping motor comprises a plurality of stator coils which are successively energized in response to pulses applied to the bases of transistors connected in series with the stator coils respectively. To ensure that the rotor be set in motion from a predetermined angular position, a particular set of stator coils is energized to maintain the rotor in that angular position preparatory to the starting of the motor when power is switched in.

A failure detection circuit known in the art permits detection of an open circuit failure of the transistors associated with the initially energized stator coils and detection of an open circuit in the initially not energized stator coils and a short circuit failure of the transistors associated with the latter stator coils. However, other failures including open circuit of the initially energized stator coils, short circuit of the transistors associated with the initially energized coils and an open circuit failure of the transistors associated with the initially not energized coils, are not detected until the rotor has been set in rotation.

The inability of the prior art detection circuit to ascertain all possible failures of a stepping motor prior to its operation is disadvantageous since it results in delay in taking necessary actions to remove the failed components with a resultant loss of its operating time.

SUMMARY OF THE INVENTION

Accordingly, an object of the present invention is to provide an improved failure detection circuit in which all the operating states of the motor control circuitry and its stator coils are ascertained prior to the time the rotor is set in motion.

When power is switched in, a predetermined set of stator coils is initially energized in response to the conduction of the associated transistor. The logic states of the potentials applied to the bases of all the transistors are compared with the potentials at respective circuit junctions between the transistors and the associated stator coils to give a warning indication if the compared potential levels have a predetermined relation between them. During this initial interval, the conducting state of the transistors associated with initially energized coils and the nonconducting state of the transistors associated with other stator coils and continuity of the latter are ascertained. In a subsequent interval, the present invention contemplates to activate the transistors associated with the initially not energized coils for a short duration so that these coils are not sufficiently energized to impart a torque to the rotor. During this interval the conducting state of the activated transistors and the nonconducting state of the transistors associated with the initially energized coils and continuity of the latter are ascertained by comparing the potentials applied to all the transistors and the potentials at the aforesaid circuit junctions.

BRIEF DESCRIPTION OF THE DRAWINGS

The present invention will be further described by way of example with reference to the accompanying drawings, in which.

DETAILED DESCRIPTION

Figure 1:
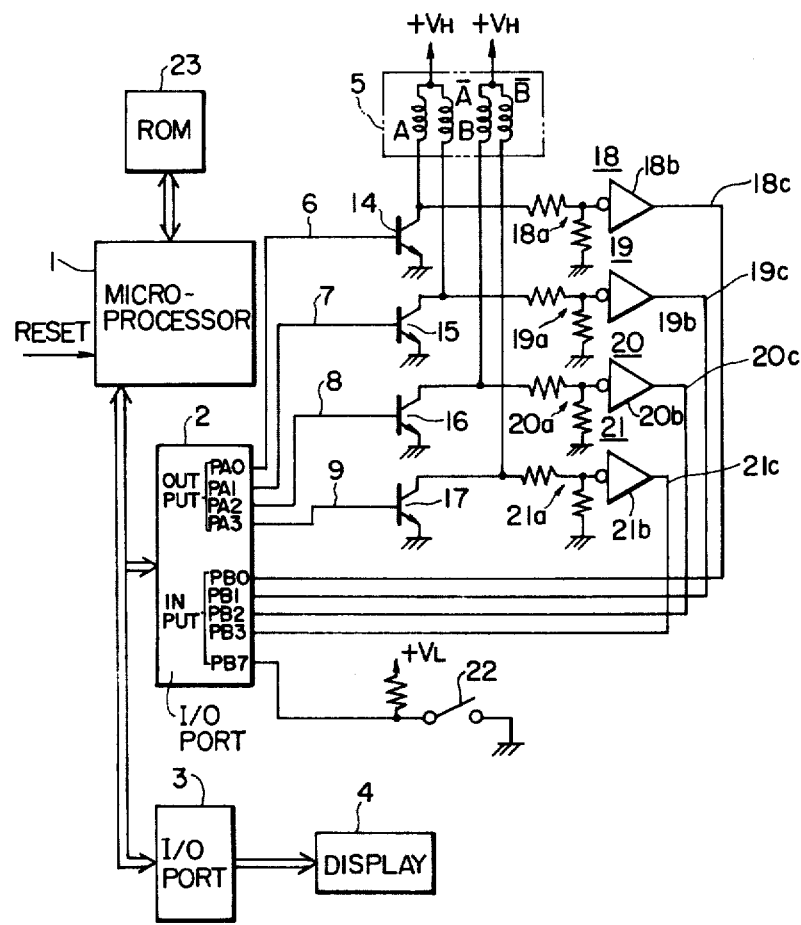
FIG. 1 is an illustration of a first preferred embodiment of the invention in which a microcomputer is employed.

Referring now to FIG. 1, a first preferred embodiment of the invention is illustrated. The apparatus of the invention according to the first embodiment generally comprises a stepping motor 5, a display unit 4 and a microcomputer 1 including a microprocessor 1, a read-only memory 23, and input/output ports 2, 3. For purposes of the disclosure the stepping motor 5 comprises four stator coils A, $\overline{A}$, B and $\overline{B}$ which are energized by two-phase currents. The input/output port 2 includes a set of four output terminals PA0, PA1, PA2 and PA3 which are connected respectively to the bases of power switching transistors 14, 15, 16 and 17 through conductors 6, 7, 8 and 9. The collector-emitter paths of transistors 14, 15, 16, 17 are connected in series with the stator coils A, $\overline{A}$, B and $\overline{B}$, respectively, of the stepping motor from the ground terminal to a d.c. voltage supply $+V_H$ to energize the respective coils in response to the logical states of the output terminals of the input/output port 2. The collectors of transistors 14, 15, 16, 17 are further connected to voltage sensing circuits 18, 19, 20 and 21, respectively, and thence to the input terminals PB0, PB1, PB2 and PB3 of the input/output port 2.

Figure 2:
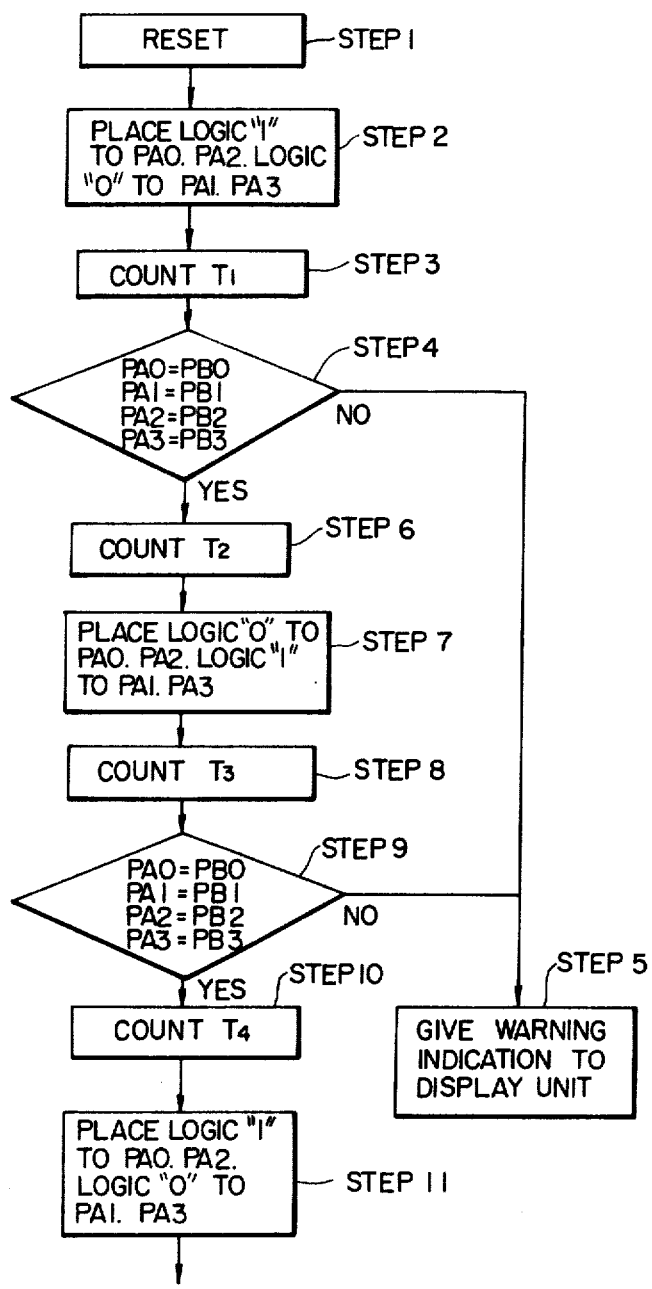
FIG. 2 is an illustration of a flow chart associated with the microcomputer of FIG. 1.

The read-only memory 23 is programmed to execute a sequence of steps illustrated in FIG. 2. In response to the operation of a power switch, not shown, in step 1, a reset pulse is applied to the microprocessor 1 to initiate a timing action and at the same time to cause it to receive instructions from the ROM 23 in step 2 in order to generate a set of logical signals at the output terminals of the input/output port 2. More specifically, the terminals PA0 and PA2 are driven into logical one states and the terminals PA1 and PA3 are driven into logical zero states. Thus, transistors 14 and 16 are rendered conductive, while transistors 15 and 17 remain nonconductive. The stator coils A and B are initially energized to ensure that the rotor, not shown, is held in a predetermined angular position until stator coils $\overline{A}$ and $\overline{B}$ are subsequently energized. The subsequent energization of coils $\overline{A}$ and $\overline{B}$ causes the rotor to set in rotation.

Each of voltage sensing circuits comprises a resistor network "a" formed by two resistors connected in parallel with the collector-emitter path of the associated transistor, and an inverter "b" having its input connected to a junction between the resistors and its output connected through a conductor "c" to the associated input terminal of the input/output port 2.

Because of the conduction of the transistors 14 and 16, the potential at the input terminal of the inverters 18b and 20b are at logical zero so that logical one signals appear at the input terminals PB0 and PB2. Likewise, the nonconducting state of transistors 15 and 17 causes logical zero signals to appear at the input terminals PB1 and PB3.

At the termination of a time interval $T_1$ which is counted in step 3 in the microprocessor 1, the latter is instructed to make comparisons between the logical states of the output terminals PA0–PA3 and the logical states of the input terminals PB0–PB3. More specifically, the comparison is made between terminals PA0 and PB0, between terminals PA1 and PB1, between PA2 and PB2, and between PA3 and PB3. If the transistors 14 and 16 are functioning properly, coincidence occurs between the terminals PA0 and PB0 and also between PA2 and PB2. In addition, if the transistors 15 and 17 are functioning properly and the stator coils $\overline{A}$ and $\overline{B}$ are not disconnected, coincidence also occurs between terminals PA1 and PB1 and between terminals PA3 and PB3. These comparisons are executed in step 4. If no coincidence should occur between the corresponding terminals, the microprocessor 1 proceeds to step 5 to cause the display unit 4 to receive error indicating signals from the microprocessor 1 to give indication of the failure.

Figure 3:
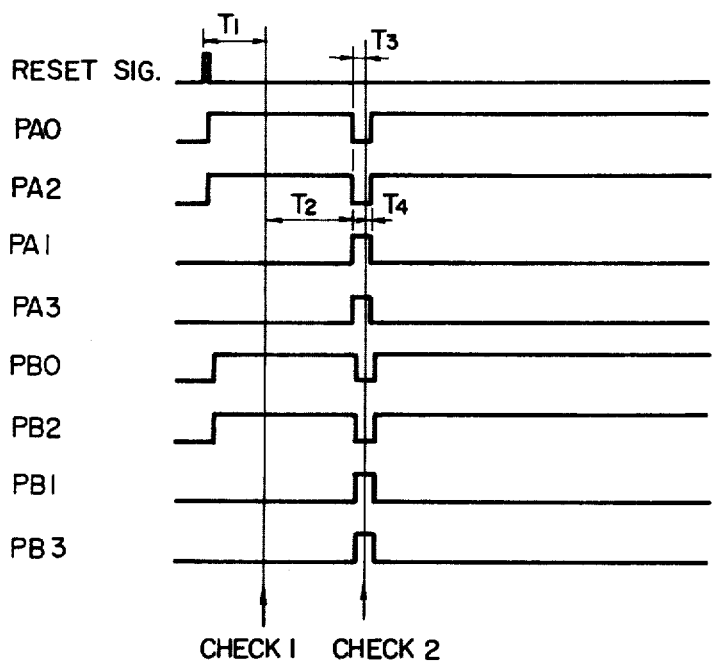
FIG. 3 is an illustration of waveforms appearing in the circuit of FIG. 1.

At the termination of the interval $T_1$, the microprocessor 1 is instructed to initiate timing action and if coincidence occurs between the corresponding terminals in step 4, the microprocessor goes to step 6 to terminate the timing action at the end of an interval $T_2$. The microprocessor proceeds to step 7 where it is instructed to change the logical states of the output terminals PA0 to PA3, as a result of which the transistors 14 and 16 are turned off and the transistors 15 and 17 are turned on. Therefore, the logical states of the output and input terminals are reversed as illustrated in FIG. 3 at the termination of the interval $T_2$. At the same time, the microprocessor 1 initiates a third time counting action in step 8 to define a time interval $T_3$. At the end of this interval the microprocessor 1 proceeds to step 9 to make comparisons between the corresponding output and input terminals to check for conduction of transistors 15 and 17 and provides an open circuit test for transistors 14 and 16 as well as a continuity test for the stator coils A and B. If malfunction occurs, the microprocessor goes to step 5 to give an indication of the error and if all the circuit elements are functioning properly, the microprocessor 1 proceeds to step 10 to initiate a further counting action to define a time interval $T_4$. At the end of this interval, the microprocessor 1 goes to step 11 to change the logic states of the output terminals PA0 to PA3 so that they are equal to the logic states of step 2. The set of these logic states is retained until a drive command signal is applied from an external source.

It is to be noted that the combined length of time intervals $T_3$ and $T_4$ should be too small for the stepping motor 5 to generate a torque so that testing operation is completed before the motor starts rotating.

A reset key 22 is provided to permit the checking as described above when the stepping motor is running.

Figure 4:
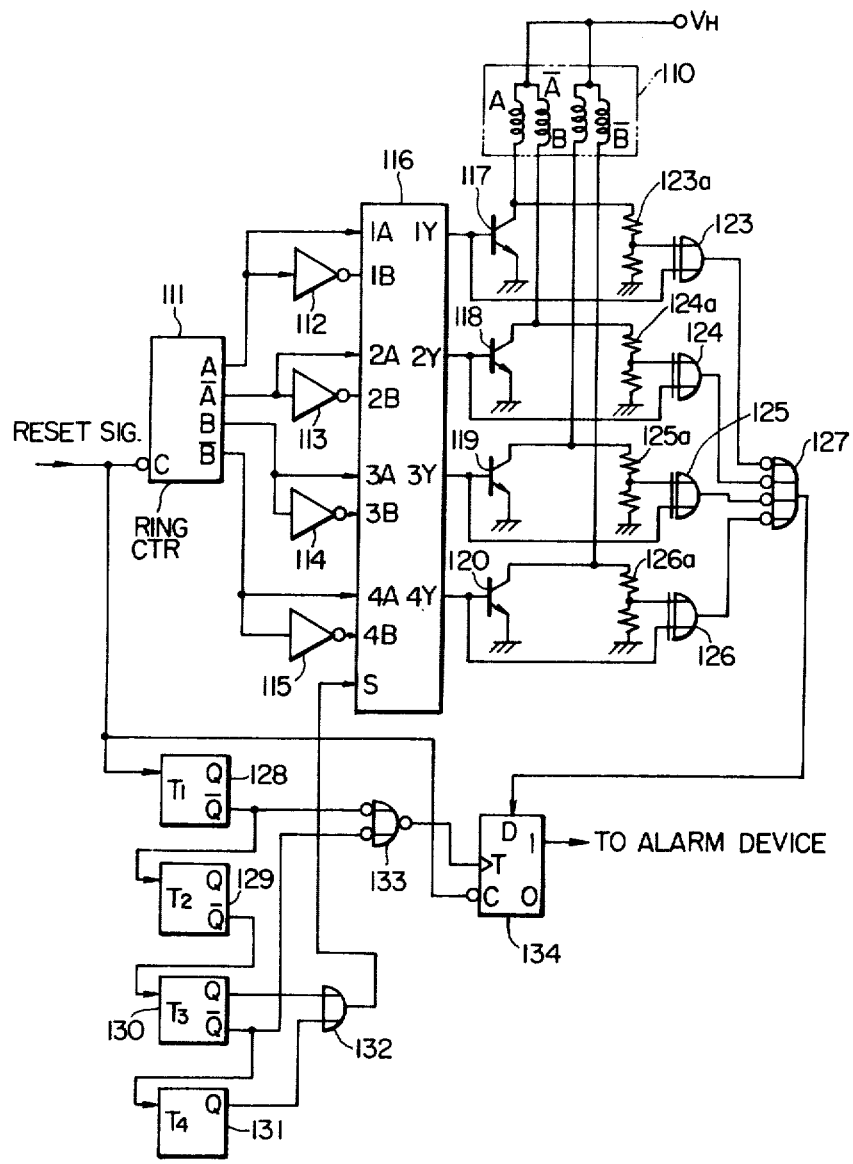
FIG. 4 is an illustration of a second preferred embodiment of the invention in which discrete circuit components are employed.

A second embodiment of the present invention is illustrated in FIG. 4 in which the present invention is realized by discrete circuit elements. The circuit of FIG. 4 comprises generally a ring counter 111 having a set of four output terminals A, $\overline{A}$, B and $\overline{B}$ which are directly connected to input terminals 1A to 4A of a data switching network 116 and further connected through inverters 112 to 115 respectively to input terminals 1B to 4B of the network 116. The logical input signals supplied to these input terminals are selectively applied to output terminals 1Y to 4Y in response to a data select command signal applied to a select input terminals S from the output of an OR gate 132. The outputs of the data switching network 116 are coupled to the bases of transistors 117 to 120, respectively.

The stator coils A, $\overline{A}$, B and $\overline{B}$ of the stepping motor 110 are connected from the voltage supply $+V_H$ to ground through the collector-emitter paths of transistors 117 to 120, respectively, as in the previous embodiment. The collectors of transistors 117 to 120 are connected through respective voltage dividers 123a to 126a to Exclusive-OR gates 123 to 126 which receive as their other inputs from the output terminals 1Y to 4Y of the data switching network 116. Each of the voltage dividers is formed by a series-connected resistors which are selected so that the potential at the junction between them is biased to a logical zero level when the associated transistor is rendered conductive and biased to a logical one level when that transistor is rendered nonconductive or the associated stator coil of the motor is disconnected from the voltage supply.

Therefore, it is seen that each of the Exclusive-OR gates 123–126 provides a logical one output when the associated input circuit is functioning properly or a logical zero output when the input circuit has failed.

The outputs of the Exclusive-OR gates 123 to 126 are connected through an inverted OR gate 127 to the data input terminal D of a D-type flip-flop 134 which receives its trigger signal from the output of an inverted NOR gate 133.

Figure 5:
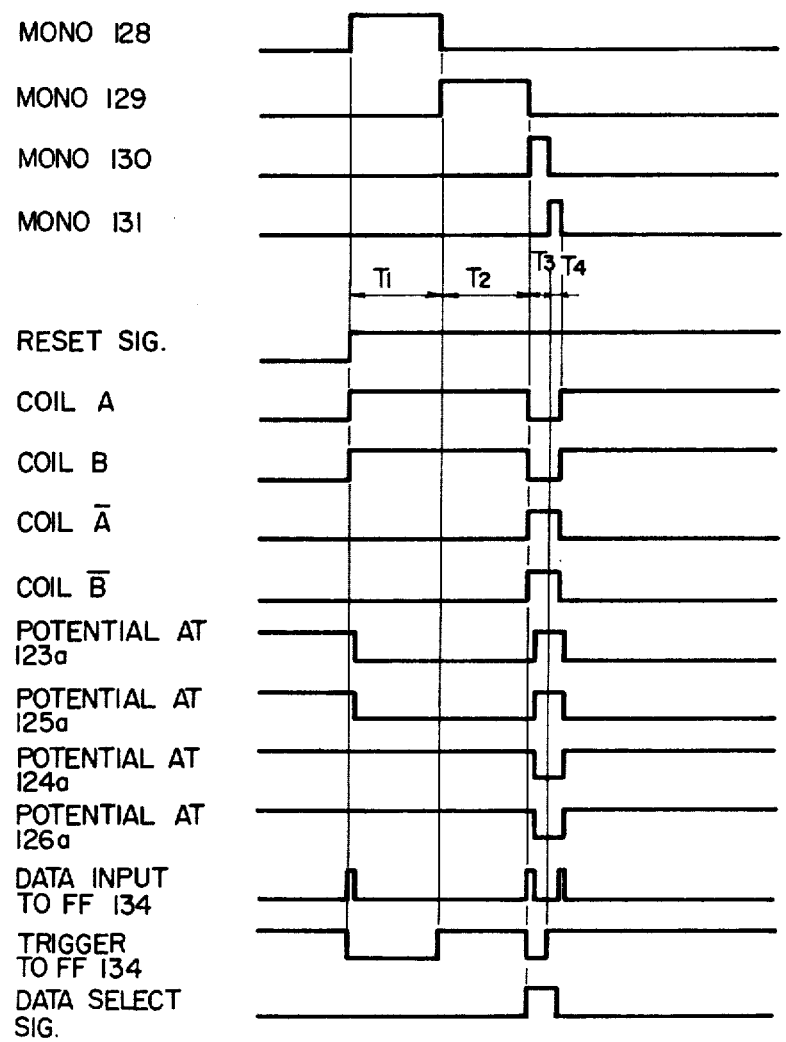
FIG. 5 is an illustration of various waveforms appearing in the circuit of FIG. 4 when the circuit components are functioning properly.

The ring counter 111 is supplied with a reset signal (logical one) from an external source, not shown to drive the A and B output terminals into a logical one state and the $\overline{A}$ and $\overline{B}$ output terminals into a logical zero state as illustrated in FIG. 5. If the transistors 117 to 120 are functioning properly and the stator coils $\overline{A}$ and $\overline{B}$ are not open-circuited, the junctions at the voltage dividers 123a and 125a are brought to logical zero states, while the junctions at the voltage dividers 124a and 126a are brought to logical one states as illustrated in FIG. 5. This results in a logical one output from each of the Exclusive-OR gates 123–126. Because of the presence of a certain amount of delay in the switching action of the transistors 117 to 120, the output of each Exclusive-OR gate rises to a logic zero level for a brief interval, resulting in a logical one input to the data input of flip-flop 134 for a short interval after the leading edge transition of the reset signal. As will be understood as the description proceeds, this short interval of logic one level at the data input cause no change in logic state of the output of the D-type flip-flop 134.

The reset signal, which is supplied to the ring counter 111, is also supplied to an input of a monostable multivibrator 128 which forms part of a cascaded connection of monostable multivibrators 129, 130 and 131. the monostable 128 generates a pulse with a period $T_1$ and the monostable 129 generates a subsequent pulse with a period $T_2$. Likewise, monostable multivibrators 130 and 131 generate pulses with respective periods $T_3$ and $T_4$ successively, as illustrated in FIG. 5.

The $\overline{Q}$ output terminals of the monostables 128 and 130 are further coupled to the trigger input of the D-type flip-flop 134 through the inverted NOR gate 133, and the Q output terminals of the monostables 130 and 131 are connected to the data select input of the switching network 116 through the OR gate 132.

The reset signal is also applied to the clear input of the D-type flip-flop 134 to clear the logic state of its output.

During the interval $T_1$ the trigger input of the D-type flip-flop 134 is driven to a logic zero level in response to the output from the mostable multivibrator 128, so that the output of the flip-flop 134 remains at the logic zero level until the termination of the interval $T_1$ when all the circuit elements are functioning properly and no alarm signal is generated.

In response to the leading edge transition of the output from the monostable multivibrator 130, the output terminals 1Y to 4Y of the data switching network 116 are switched to the logic states of the input terminals 1B to 4B, so that the output logic states are reversed in order to turn on transistors 118 and 120 and turn off transistors 117 and 119. As previously described, the normal conditions of these transistors and the absence of disconnection of stator coils A and B result in the generation of a logic zero signal at the data input of D-type flip-flop 134 which retains until the termination of the interval $T_4$. Thus, the occurrence of a logic one trigger signal to the trigger input of the D-type flip-flop 134 causes its output to remain in the logic zero state, giving no alarm indication.

Figure 6:
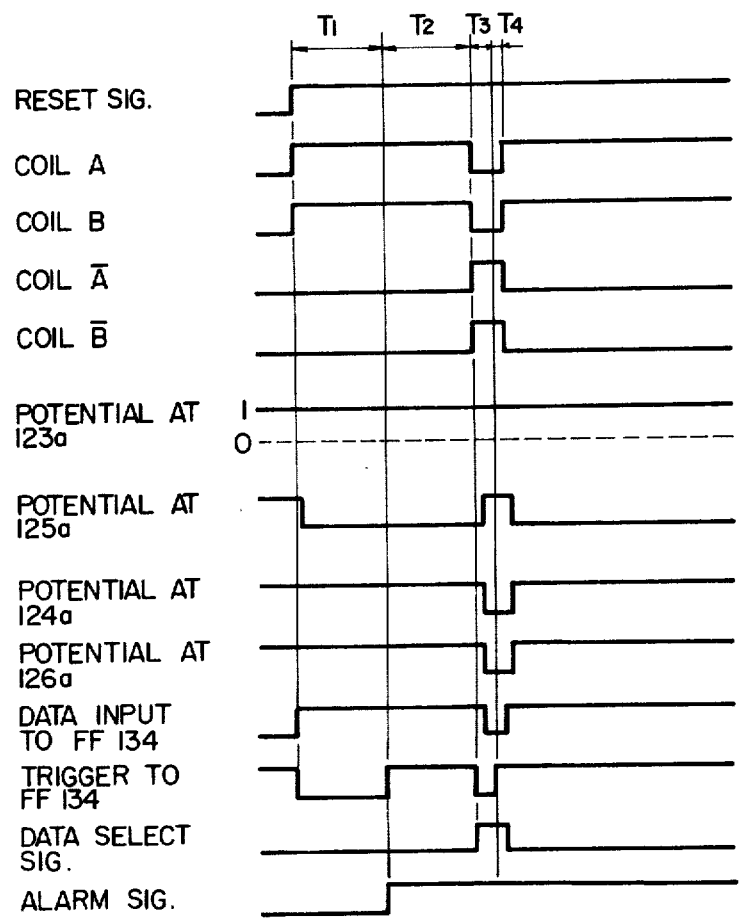
FIG. 6 is an illustration of various waveforms which appear in the circuit of FIG. 4 when the transistor 117 therein is assumed to have failed to result in a permanent open-circuit condition.

In the event transistor 117 has an open circuit failure between its collector and emitter electrodes, this will result in a logic one level at the junction of the voltage divider 123a and hence a logic one input to the data input terminal of flip-flop 134. Since the latter logic one input is present when the logic one trigger signal is generated in response to the commencement of the subsequent interval $T_2$, the output of the D-type flip-flop 134 changes to a logic one state to generate an alarm signal, as illustrated in FIG. 6.

Figure 7:
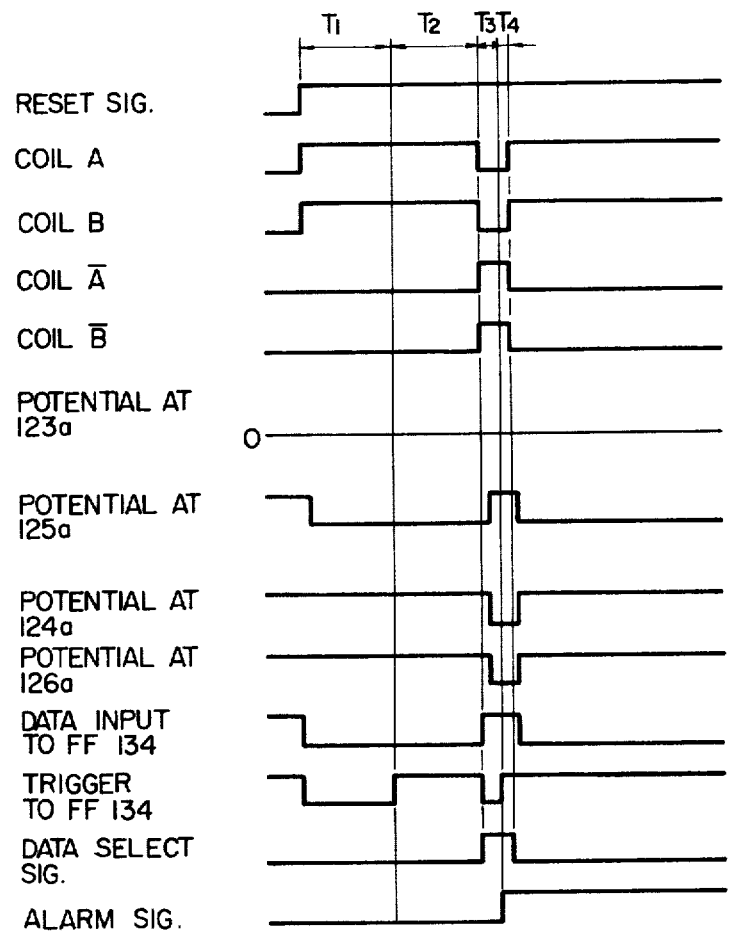
FIG. 7 is an illustration of various waveforms which appear in the FIG. 4 circuit when the transistor 117 is assumed to have failed to result in a permanent short-circuit condition.

If the transistor 117 has failed resulting in a short-circuited condition between its collector and emitter electrodes or if the coil A has been disconnected, the junction of the voltage divider 123a will be at zero logic level and hence a logic one input will result at the data input of the flip-flop 134 which is present when trigger input is applied thereto in response to the commencement of interval $T_4$, giving an alarm indication, as illustrated in FIG. 7.

Although the foregoing description has been concerned with a four-phase stepping motor of which two of the stator coils are simultaneously energized during each pulse interval, the invention is also applicable to any type of stepping motor regardless of the number of stator coils simultaneously energized for each pulse interval. In addition, in the foregoing description the stator coils $\overline{A}$ and $\overline{B}$ are energized for a short interval to provide checking without causing the rotor to set in motion, it is also possible that the stator coils $\overline{A}$ and $\overline{B}$ are energized for a longer period with currents of such a magnitude that the rotor is not given a sufficient amount of torque to be set in motion.

What is claimed is:

1. A method for detecting a failure in a stepping motor having a rotor and a plurality of stator coils which are connected in series with respective switching means, means for activating a particular switching means to energize the associated stator coil for holding said rotor in a predetermined angular position, and means for detecting whether said switching means are rendered conductive or nonconductive, said method comprising, after activation of said particular switching means, activating another switching means with a current insufficient to cause said rotor to be set in rotation and causing said detecting means to detect the conduction or nonconduction of said another switching means.

2. A method for detecting a failure in a stepping motor having a rotor, first and second stator coils, and first and second switching means for energizing said first and second stator coils respectively in response to signals at predetermined logic levels applied thereto, said first and second switching means being connected in series with said first and second coils respectively between terminals of a voltage source, comprising the steps of:
   (a) activating said first switching means in response to a signal at a first logic level for generating a current in said first coil when said rotor is at rest while deactivating said second switching means in response to a signal at a second logic level for generating no current in said second coil;
   (b) detecting a signal level at a circuit junction between the respective switching means and the associated coil;
   (c) comparing the detected signal levels with said logic levels of the step (a) to detect when the compared levels have a predetermined relationship therebetween to give warning indication;
   (d) deactivating said first switching means in response to a signal at said second logic level for generating no current in said first coil while activating said second switching means in response to a signal at said first logic level for generating a current in said first coil so that said current is insufficient to give a torque to said rotor;
   (e) repeating the step (b); and
   (f) comparing the signal levels detected in the step (e) with said logic levels of the step (d) to detect when the compared levels have a predetermined relationship therebetween to give warning indication.

3. A failure detection circuit for stepping motors having a first and a second stator coil, and a rotor, comprising:
   first and second switching means connected respectively in series with said first and second coils between terminals of a voltage source for energizing said coils at alternate intervals in response to a signal applied thereto;
   means for activating said first switching means in response to a potential of a first logic level and deactivating said second switching means in response to a potential of a second logic level when said rotor is at rest, and successively deactivating said first switching means and activating said second switching means in response to potentials of said second and first logic levels, respectively, the energy supplied to said second stator coil when said second switching means is activated being of a magnitude insufficient to impart a torque to said rotor; and means for detecting when the potential at a circuit junction between the respective switching means and the associated stator coil has a predetermined relationship with the respective logic level of said potentials to give warning indication.

4. a failure detecting circuit as claimed in claim 3, wherein said detecting means comprises means for detecting when the potentials at said respective circuit junctions have a first predetermined relationship with the respective logic levels of said potentials when said first switching means is activated to check if there is an open circuit condition in said first switching means, or a short circuit condition in said second switching means, or an open circuit in said second stator coil, and for detecting when the potentials at said respective circuit junctions have a second predetermined relationship with the respective logic levels of said potentials when said second switching means is activated to check if there is an open circuit condition in said second switching means, or a short circuit condition in said first switching means, or an open circuit in said first stator coil.

5. A failure detection circuit as claimed in claim 3, wherein said detecting means comprises an Exclusive-OR gate having a first input connected to a control terminal of the associated switching means and a second input terminal connected to be responsive to the potential at the associated circuit junction.

* * * * *